United States Patent [19]

Forney, Jr. et al.

[11] 4,127,319
[45] Nov. 28, 1978

[54] TERMINATION MEANS FOR FIBER OPTIC BUNDLE

[75] Inventors: Edgar W. Forney, Jr.; Tore R. Johnson, both of Harrisburg; Michael F. O'Keefe, Mechanicsburg, all of Pa.

[73] Assignee: AMP Incorporated, Harrisburg, Pa.

[21] Appl. No.: 802,411

[22] Filed: Jun. 1, 1977

[51] Int. Cl.[2] .............................................. G02B 5/16
[52] U.S. Cl. ............................... 350/96.20; 350/96.22
[58] Field of Search ................ 350/96.20, 96.21, 96.22

[56] References Cited

U.S. PATENT DOCUMENTS

| 3,628,036 | 12/1971 | Humphrey | 350/96.20 |
|---|---|---|---|
| 3,655,275 | 4/1972 | Seagreaves | 350/96.20 |
| 3,790,791 | 2/1974 | Anderson | 350/96.20 |
| 3,936,145 | 2/1976 | McCartney | 350/96.22 |
| 3,950,075 | 4/1976 | Cook et al. | 350/96.22 |
| 3,999,837 | 12/1976 | Bowen et al. | 350/96.22 |

*Primary Examiner*—John K. Corbin
*Assistant Examiner*—Stewart Levy
*Attorney, Agent, or Firm*—Gerald K. Kita

[57] ABSTRACT

A means for terminating a bundle of glass optical fibers comprising a single plastic element and a single metal ferrule. The plastic element has four main, generally concentric, sections beginning with a nut on one end, an externally threaded portion adjacent the nut, a cylindrically-shaped portion adjacent the threaded portion but with a smaller diameter and employed to align the plastic element in a coaxial coupling means, and a small tubular portion adjacent the cylindrical portion and concentric therewith. The metal ferrule fits around the small tubular portion. An aperture having portions of decreasing diameters extends concentrically through the plastic element with the largest diameter portion being at the nut end and the smallest diameter portion being within the small tubular portion. The bundle of glass fibers with the sheath thereon extends into a first portion of the aperture, and an unsheathed portion of the bundle of glass fibers extends through a second portion of the aperture and then into the tubular portion of the plastic element which is the smallest diameter portion of the aperture. The metal ferrule is crimped over the plastic tubular element which in turn is crimped around the glass fibers to retain them in the plastic element. The end of the tubular element and the retained fibers are ground off to a predetermined distance from a reference point in the termination means so that said fibers can properly abut against a similarly terminated bundle of fibers or some other type of mating optical device.

4 Claims, 6 Drawing Figures

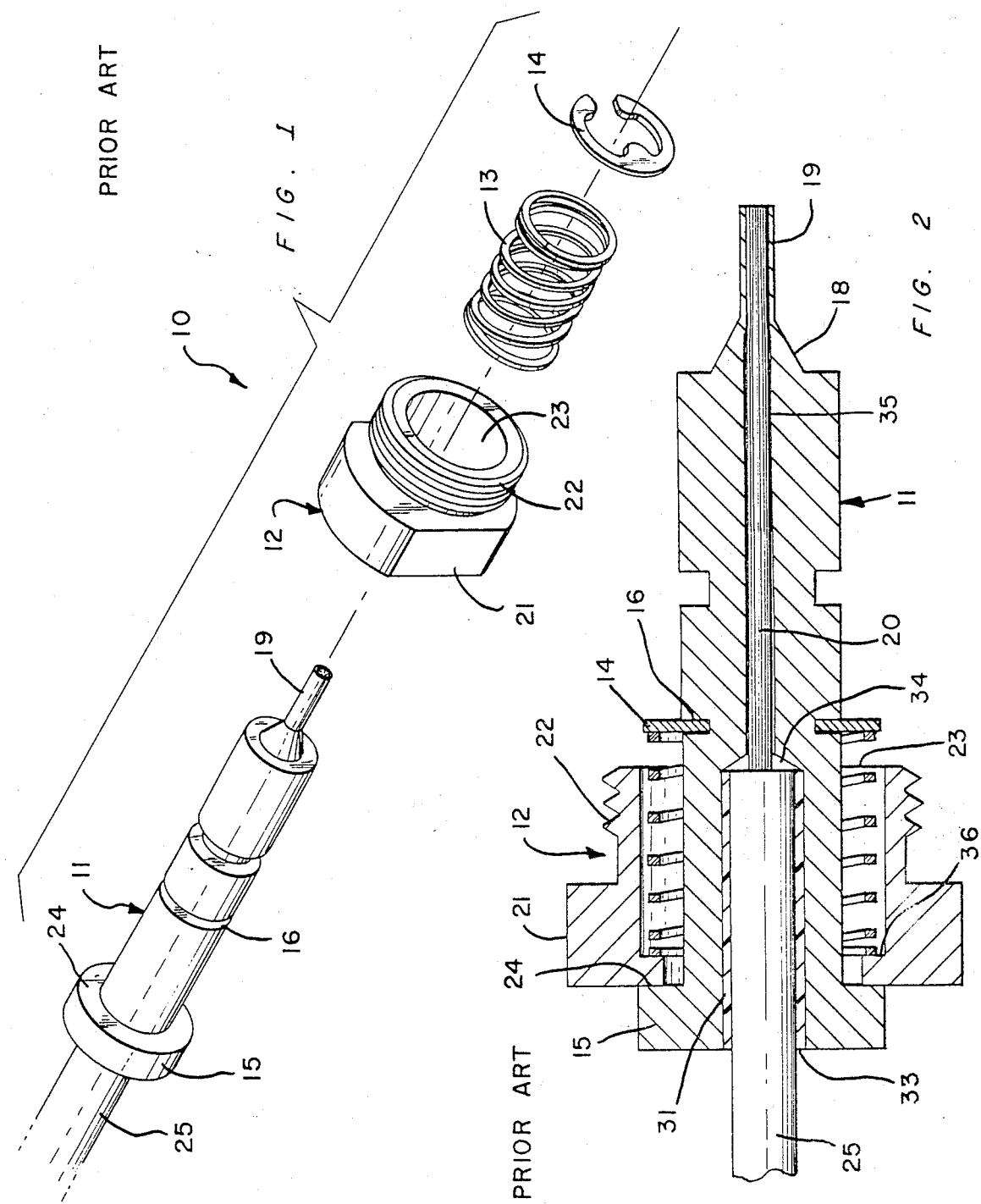

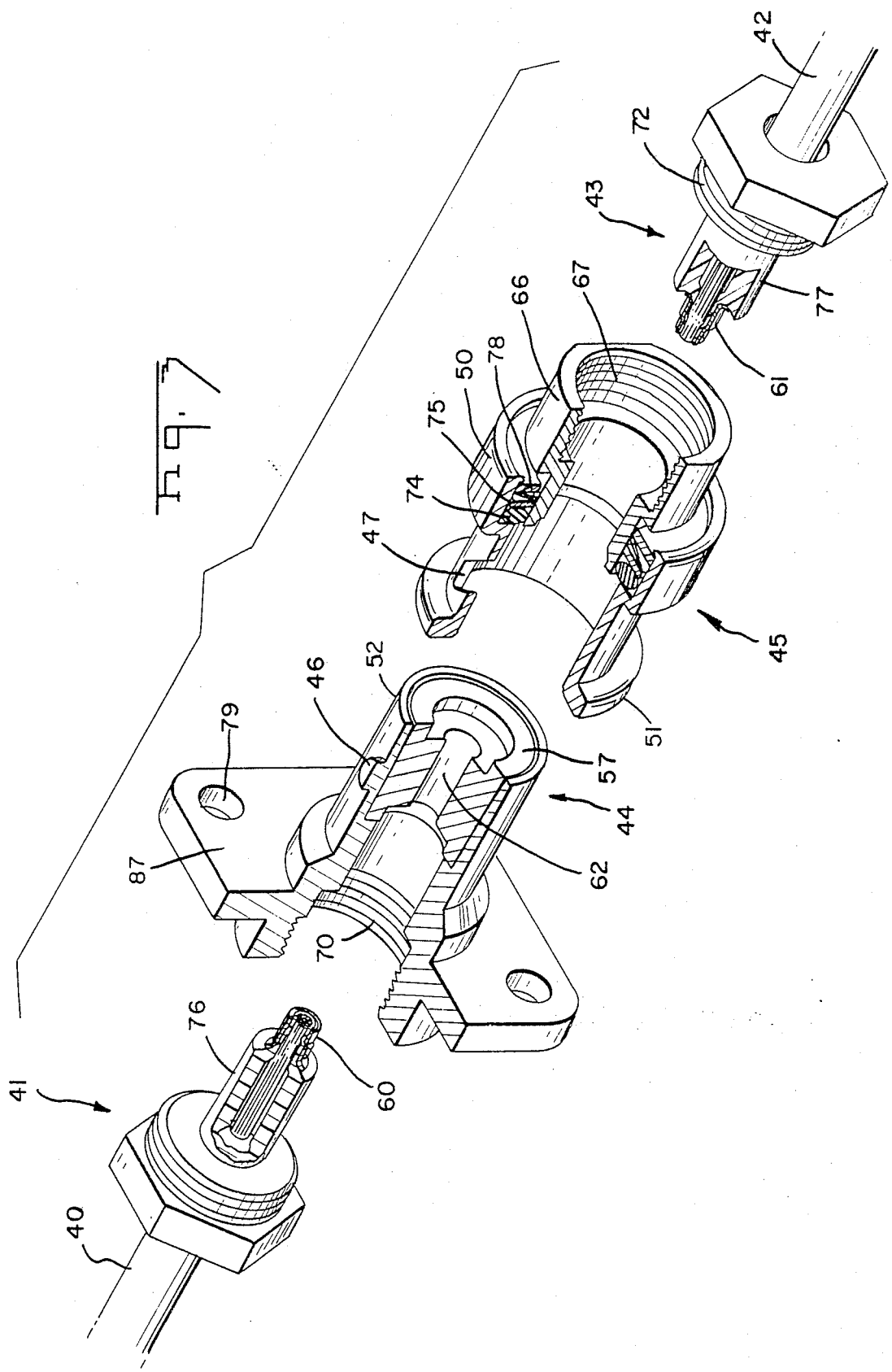

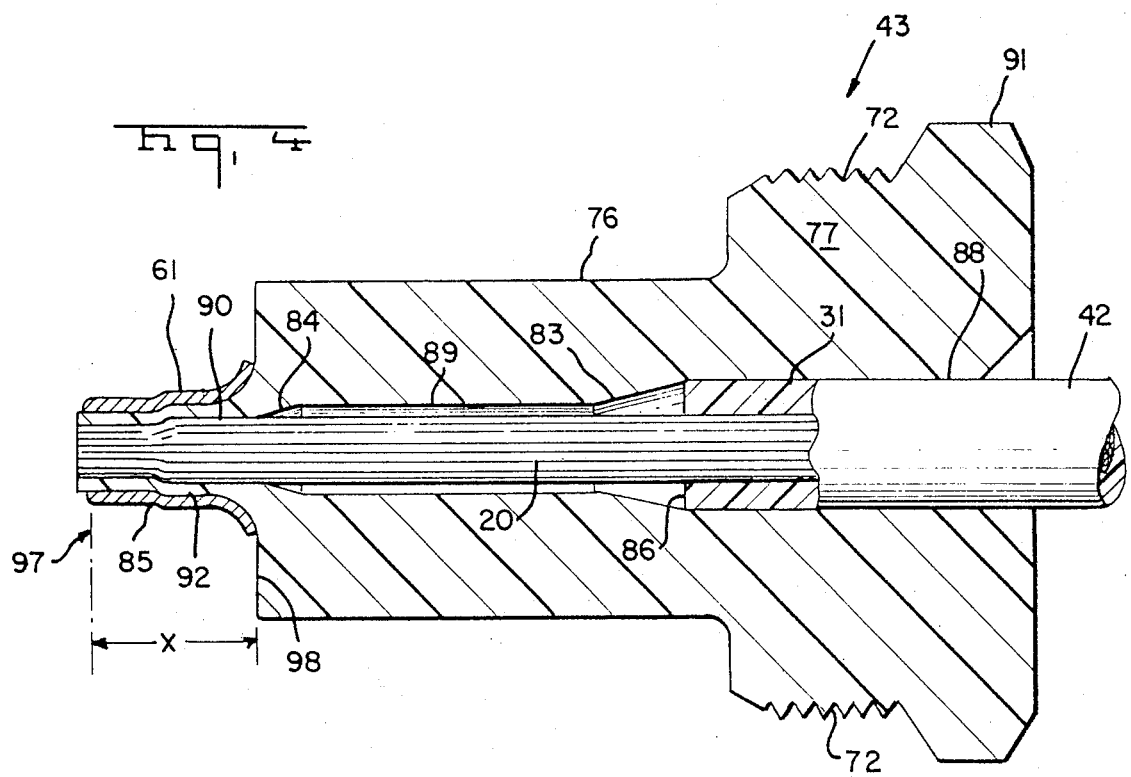
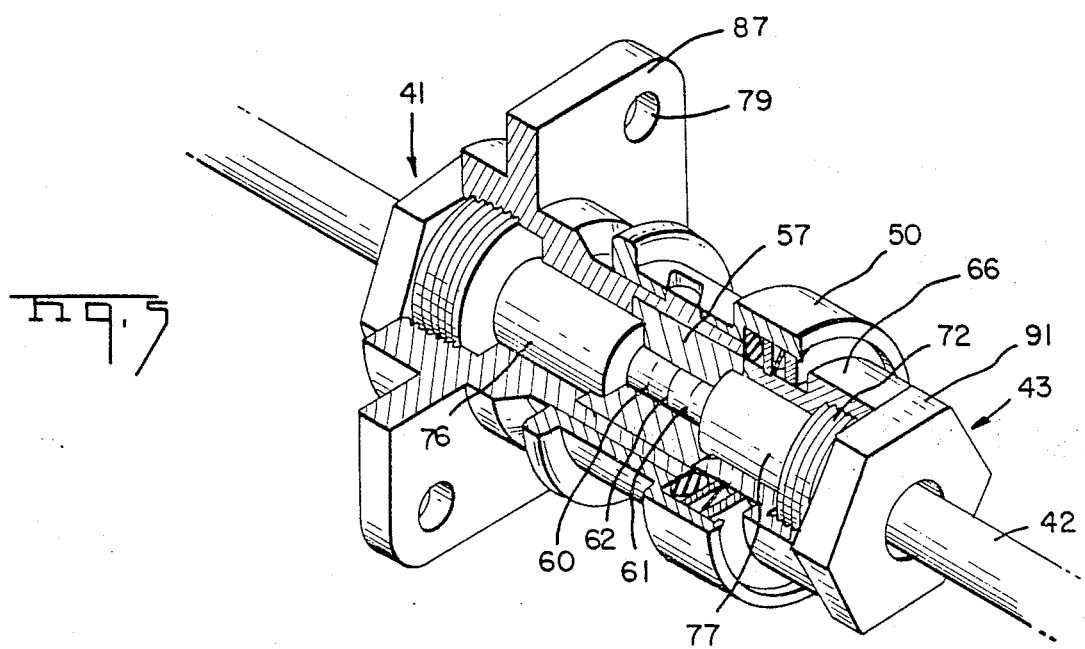

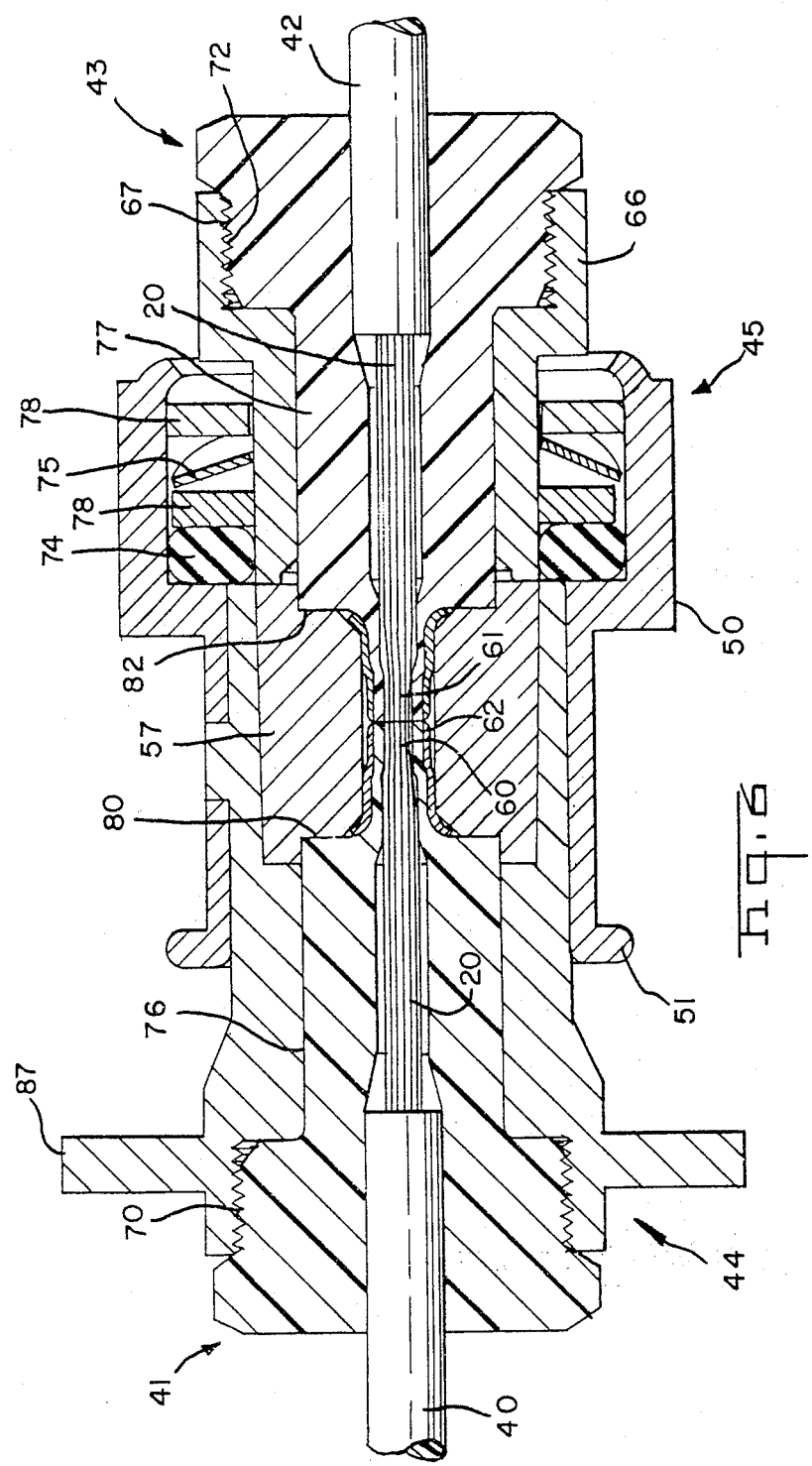

TERMINATION MEANS FOR FIBER OPTIC BUNDLE

BACKGROUND OF THE INVENTION

This invention relates generally to connectors for terminating fiber optic bundles such as glass fibers and more particularly the invention relates to a simplified fiber bundle terminating means comprising a single plastic element and a single metal ferrule.

There are several types of fiber bundle connectors presently available on the market. Those connectors which connect together two fiber bundles or two coaxial cables in a butt splice arrangement frequently consist of four sections, including a termination on the end of each of the fiber bundles to be connected together and a coupling means consisting of two sections which are joined together by suitable means such as a spring loaded bayonet type connection, with the terminations on the ends of the bundles being matable with open ends of the two coupling sections by threaded means for example.

One prior art means of terminating the fiber optic bundles consist of a generally cylindrically-shaped metal element having an aperture extending through the axis thereof which receives the fiber optic bundle. The aperture is divided into sections having diminishing diameters all concentric with each other and with the sheathed fiber optic bundle entering the largest diameter aperture section from a first end of the termination means and with the unsheathed fiber optic bundle extending through the terminating means and entering the smallest diameter portion thereof which opens onto the second end of said termination means, which second end first enters into one of the two coupling sections. The second end of said metal termination means is usually tubular in shape and crimped directly around the glass fiber bundle. The end of the tubular section is ground so that the glass fibers retained therein terminate in a plane perpendicular to the axis of the aperture and have a desired predetermined length measured from a reference point, such as a shoulder formed on the metal termination means, to thereby ensure that the ends of one optic bundle will abut against and mate with the ground end of a second optic bundle within the coupling means.

A metal termination means further requires a spring loaded nut secured therearound which is abutted on one side against a shoulder on the terminating means and retained on the other by a "C" snap washer which fits within a groove formed around the circumference of the cylindrically-shaped termination means. Thus, the prior art structure for terminating a fiber optic bundle consists of four elements including a main, generally cylindrically-shaped body with a groove formed thereon and a smaller diameter tubular element at one end thereof, a metal nut positioned around the cylindrical-shaped body and backed up against a shoulder on one side thereof, a spring mounted within a cavity formed in said nut and a "C" snap washer snapped into a groove around said cylindrical body to spring load the nut on said cylindrical body.

It is to be noted that the above described prior art terminating means involves the crimping of the inside metal surface of a tubular element directly upon the glass fibers, which frequently results in damage to those glass fibers which are immediately adjacent the inside metal surface of the tubular element.

Further, the cost of such prior art means of terminating fiber optic bundles is quite high inasmuch as it requires four parts, all of which are metal and at least two of which must be machined, including the nut and the main cylindrical-shaped body.

BRIEF STATEMENT OF THE INVENTION

It is a primary object of the invention to provide an inexpensive means for terminating a fiber optic bundle, such as a bundle of glass fibers.

It is a second aim of the invention to provide an inexpensive fiber optic bundle termination means consisting of a unitary plastic element and a metal ferrule and wherein the metal ferrule is crimped over and around a plastic sleeve which is part of the unitary plastic element and which contains the fiber optic bundle.

A third purpose of the invention is to provide an inexpensive fiber optic termination means consisting of a single plastic element and a metal sleeve.

A fourth aim of the invention is to provide a fiber optic terminating means consisting of a single piece plastic element which is constructed to retain the fiber optic bundle and a metal sleeve which is crimped around a tubular portion of the single plastic element to force said tubular plastic portion around the fiber optic bundle and thereby retain said fiber optic bundle in the terminating means.

It is a fifth purpose of the invention to provide an inexpensive plastic terminating means for a fiber optic bundle which is matable with one section of a two section coupling means which can be of the bayonet type, for example.

A sixth object of the invention is the improvement of fiber optic terminating means generally.

In accordance with one form of the invention there is provided a means for terminating a fiber optic bundle, such as a bundle of glass fibers, which termination means is compatible with either section of a two section coupling means of the type employed to couple together coaxial cables, and with said terminating means comprising a single plastic element and a metal sleeve. The single plastic element comprises a first cylindrical portion constructed to maintain alignment of the plastic element within the coupling half, a tubular portion extending concentrically from the first end of the cylindrical portion and inwardly into the coupling means when mated therewith, a threaded portion extending from the second end of said cylindrical portion, and a nut-shaped portion for securing said threaded portion into a mating threaded portion within said coaxial coupling. A fiber optic bundle receiving aperture extends longitudinally through the plastic element in stages of gradually diminishing diameter with that portion of the aperture near the nut end of the plastic element receiving the sheathed fiber optic bundle and with the aperture within the tubular portion receiving the unsheathed fiber optic bundle. The metal ferrule is slipped over the tubular portion and crimped thereon to force said tubular portion of the plastic element securely around the enclosed fiber optic bundle.

In accordance with a feature of the invention the end of the metal ferrule enclosed tubular portion is ground so that the ends of the glass fibers lie in a plane which is perpendicular to the axis of the tubular portion and spaced a predetermined distance from said first end of said cylindrical portion of the plastic element.

BRIEF DESCRIPTION OF THE DRAWINGS

The above-mentioned and other objects and features of the invention will be more fully understood from the following detailed description thereof when read in conjunction with the drawing in which:

FIG. 1 is an exploded and perspective view of the prior art termination of a fiber optic bundle;

FIG. 2 is a longitudinal sectional view of the assembled prior art termination means of FIG. 1;

FIG. 3 is an exploded isometric view of two halves of a coupling means with a fiber optic bundle connected to both ends thereof by the terminating means of the present invention;

FIG. 4 is a longitudinal sectional view of the plastic fiber optic bundle terminating means of the present invention;

FIG. 5 is an assembled view of the structure of FIG. 3 employing the fiber optic bundle terminating means of the present invention and a bayonet-type coupling means; and FIG. 6 is a longitudinal sectional view of the structure of FIG. 5.

DETAILED DESCRIPTION OF THE INVENTION

FIG. 1 shows a prior art means of terminating a fiber optic bundle. The termination means 10 is all metal and includes the cylindrical body 11 terminated at the left hand end by an enlarged diameter portion 15 having a shoulder 24, and at the right hand end by a smaller diameter tubular section 19 with the ends of the optical fibers 20 exposed at the end of tubular section 19.

The termination means also includes the element 12 which includes a nut portion 21 and an externally threaded portion 22. The element 12 slips over the cylindrical body 11 with the nut portion 21 backed against the shoulder 24 of the enlarged portion 15 of element 11. A spring means 13 also slips over the cylindrical body 11 and into the cavity 23 of element 12. A "C" snap washer 14 fits within the groove 16 to lock the spring means 13 in a compressed state between snap washer 14 and a shoulder 36 provided within element 12.

The structure of FIG. 1 is shown in its longitudinal cross-sectional form in FIG. 2. The "C" washer 14 can be seen to be compressing the spring means 13 within the cavity 23 of the nut portion 21 and thereby spring load the element 12 against the shoulder 24 of the enlarged portion 15 of the main cylindrical body 11. The bundle of fiber optics 20 is contained in a sheath 31. The sheathed bundle 25 is inserted into aperture portion 33 in the cylindrical element 11 up to point 34 where the aperture portion 33 tapers down to aperture portion 35, which is of less diameter than aperture portion 33 and contains only the optical fibers 20.

The small tubular section 19 is crimped directly over the glass fibers 20. Since the tubular element 19 is of metal, damage frequently occurs to the glass fiber bundle 20 when crimping occurs. Such damage takes the form usually of broken fibers near the surface of the bundle where the metal of tubular section 19 makes contact therewith.

Reference is now made to FIG. 4 which shows a longitudinal section of the terminating means 43 for the fiber optic bundle. In FIG. 4 it can be seen that the termination means consists of two elements. One of these elements is a large plastic element 77 and the other element is a relatively small tubularly shaped metal ferrule 61 which can be of copper, for example. The plastic element 77 consists of an end portion 91 in the form of a nut for screwing the threaded portion 72 into one of the halves of the coupling means 44 (shown in FIG. 3). The plastic element 77 also includes a cylindrically shaped section 76 which fits within an aperture of slightly larger diameter in one of the halves of the coupling means 44 to align the terminating means of FIG. 4 with the two halves of said coupling means and also with a second fiber optic terminating means 41 which is identical to that in FIG. 4, as shown in FIGS. 5 and 6 and which will be discussed in detail later herein.

A fourth section of the plastic element 77 of FIG. 4 is a small plastic tubular section 92 which fits around the optical fibers 20. A metal ferrule 61 is slipped over the plastic tubular section 92 and crimped thereon. The crimping force is passed through the plastic section 92 to grip the optical fibers 20 therein. Because of the relative softness and compliancy of the plastic tubular section 92 there is very little breakage of the optical fibers 20 as the metal ferrule 61 is crimped around the plastic tubular section 92.

It can be seen that an aperture extends entirely through the terminating means of FIG. 4 and is concentric therewith. Such an aperture is formed in sections with the diameter of successive sections decreasing in incremental amounts from the end portion 91 of the plastic element 77 to the tubular section 92 thereof. That portion of the aperture which has the largest diameter is identified by reference character 88 and is large enough to receive the bundle of fiber optics 20 with the sheath 31 therearound. At the point 86 the diameter of the aperture decreases by means of tapered portion 83 to a size indicated by reference character 89. It is to be noted that the diameter of the portion 89 of the aperture is larger than the diameter of the bundle of fiber optics without the sheathing, the sheathing terminating at point 86.

The diameter of the aperture again decreases through a tapered portion 84. The diameter of the resulting section 90 is approximately the same diameter, although slightly larger, as the diameter of the bundle of optical fibers. A metal ferrule 61 fits around the plastic tubular section 92 and is crimped to a slightly smaller diameter, as indicated by reference character 85, to cause the plastic tubular portion 92 to grip the optical fibers 20 securely therein, but without damage.

After crimping the optical fiber bundle 20 within tubular section 92, the end of tubular section 92 and the optical fibers 20 are ground off to a plane 97 which is spaced a predetermined distance X from a reference point such as the shoulder 98 of the cylindrically shaped section 76 of plastic element 77. Such predetermined distance X guarantees that the ground ends of the optical fibers of the two terminating means 41 and 43 will abut against each other as shown in FIGS. 5 and 6.

Referring now to FIG. 3 there is shown an exploded view of an assembly including two sheathed optical fiber bundles 40 and 42 which are terminated respectively in termination means 41 and 43 and which can fit into opposite ends of the coupling means such as the one shown in FIG. 3 which is comprised of two halves 44 and 45.

The terminating means 41 and 43 are partly broken away to show the internal structure of terminating means and its relation to the bundles of fibers 40 and 42, respectively.

The coupling means 45 has a cylindrical portion 50 which extends to a supporting ring 51 at the open end thereof and slips over a cylindrically-shaped shell 52 of the coupling half 44. The coupling arrangement of FIG. 1 is a bayonet type with the pin 46 on the shell 52 of coupling half 44 slipping into the channel 47 in half 45 of the coupling means and locking in a pocket (not shown) at the top of the channel 47 in a conventional manner.

A second cylindrical portion 66 in half 45 of the coupling means has a threaded portion 67 at the right hand end thereof which receives threaded portion 72 of terminating means 43. When the threaded portion 72 of terminating means 43 is screwed into the threaded portion 67 of coupling half 45 the small diameter tubular metal ferrule 61 thereof will fit into the aperture 62 of coupling half section 44. Similarly when the threaded portion 71 of terminating means 41 is screwed into the threaded portion 70 of coupling half 44 the small tubular metal ferrule 60 of terminating means 41 will slip into the aperture 62 of coupling half 44 where it will abut against the ground end of the small tubular metal ferrule 61 of terminating means 43.

The outer cylindrical portion 50 of coupling half 45 is secured with respect to the inner cylindrical portion 66 by means of an "O" ring 74, a pair of washers 78, a bell type spring washer 75 and a and a washer 76 76, all of which are best seen in FIG. 6.

The function of the two washers 78, the "O" ring 74 and the bell washer 75 create a spring-loaded relationship between the portions 66 and 50 in the coupling half 45, thereby permitting the portion 50 to move in the direction of arrow 83 in FIG. 6 with respect to portion 66 during the coupling and uncoupling of the two halves 45 and 44.

The flange 87 and aperture 79, shown in FIGS. 3 and 6, provide a means for mounting the coupling means 44 on a suitable panel.

Referring now to FIG. 6, the structure of FIG. 3 is shown in a longitudinal cross-sectional view and in an assembled manner. It is to be noted that FIG. 5 also shows the structure of FIG. 3 but in an assembled manner with a portion thereof broken away, and in an isometric view rather than a longitudinal cross-sectional view. The various corresponding parts of the assembled conductor, including the two fiber bundle terminations and the pair of coupling halves are identified by the same reference characters in FIGS. 5 and 6 as they are in FIG. 3.

In FIG. 6 it can be seen that the spacer element 57, which is part of the coupling means, functions not only to space the two bundle terminating means 41 and 43 a proper distance apart but also functions to guide the ends of the tubular portions metal ferrules 60 and 61 of terminating means 41 and 43 together within aperture 62 of spacer element 57. More specifically, shoulder 79 of cylindrical alignment element 76 of terminating means 41 abuts against shoulder 80 on the left side of spacer element 57. Similarly, shoulder element 98 of plastic element 77 abuts against shoulder 82 on the right side of spacer element 57. The space between shoulders 80 and 82 of spacer element 57 is dimensioned to cause the ground ends of fiber optic bundles 40 and 42 to abut against each other in the plane 81 within aperture 62 of spacer element 57. Because spacer element 57 is symmetrical and further because the internal configurations of the two coupling halves 44 and 45, which receive the bundle terminating means, are identical, terminating means 41 and 43 are also identical and interchangeable.

The inclusion of FIGS. 5 and 6 in the specification illustrate the simplicity of the fiber optic bundle termination means, not only in its basic construction but in the manner with which they mate with a standard bayonet type coaxial coupling means.

It is to be specifically noted that the ends of the optical fibers in the tubular portions are not only ground to lay in a flat plane but are subsequently polished. To help insure that the ends of the fibers do not fray during grinding or polishing a suitable glue, such as one of the cyanoacrylates, is first applied to the ends of the fibers. Where used herein "abutting" as it relates to the positioning of the ground and polished ends of two fiber bundles means that the said ground ends are placed very close to each other but do not actually touch. The crimping of the metal ferrule is done circumferentially. More specifically, a tool having an aperture with the capability of diminishing the diameter of said aperture or a tapered aperture is positioned or forced longitudinally onto the metal ferrule, thereby performing the crimping operation. Such a method of crimping results in a crimp having a circular cross-section.

It is to be understood that the forms of the invention shown and described herein are but preferred embodiments thereof and that various changes can be made in dimensions and proportions to accommodate different types of mating means such as coaxial couplings without departing from the spirit or scope of the invention.

We claim:

1. A means for terminating a bundle of optical fibers and comprising:
    a unitary member of plastics material having in consecutive and concentric order a nut-like end portion, an externally threaded portion, a cylindrically shaped portion of a first outer diameter and a tubular portion of a second diameter which is less than said first outer diameter;
    said member having a through bore of circular cross-section and of portions of diminishing diameters with a first section having a diameter $d_1$ extending from said nut-like portion, a second section having a diameter $d_2$ extending through said tubular portion and a third section positioned between said first and second sections and having a third diameter $d_3$ where:

$$d_1 > d_3 > d_2$$

said first and third sections and said third and second sections of said bore being joined together by tapered reducing portions;
    said bundle of optical fibers extending through said bore with that portion of said bundle which is unsheathed extending completely through said bore; and
    a metal ferrule crimped around said tubular portion to force said tubular portion around said unsheathed bundle of fibers which are retained therein.

2. A means for terminating a bundle of optical fibers in a manner connectable to a connector means and comprising:
    a unitary element of plastics material having means adapted to be secured to said connector means and a tubular portion;
    said element having a through bore of circular cross-section and a consecutive portions of diminishing diameters with the first portion having a diameter $d_1$ and a second portion having a smaller diameter $d_2$ said first and second portions of said bore being joined together by a tapered reducing portion; and said bundle of optical fibers extending through said bore with that portion of said bundle extending through said second portion being unsheathed; and a metal ferrule adapted to be crimped around said tubular portion to force said tubular portion around said unsheathed bundle of fibers which are retained therein.

3. Connector means for connecting together first and second sheathed bundles of optical fibers comprising:

terminating means for terminating each end of each of said bundles of fibers coupling means for coupling together said terminating means;

each said terminating means comprising:

an element of plastics material having in consecutive and concentric order an externally threaded portion, a cylindrically shaped intermediate portion of a first diameter and a tubular shaped end portion of a second diameter which is less than said first diameter;

said element further comprising through bore of circular cross-section and of sections of diminishing diameters with a first section having a diameter $d_1$ extending into said element from said outwardly threaded end portion, a second section having a diameter $d_2$ extending through said tubular portion and a third section positioned between said first and second sections and having a third diameter $d_3$ where:

$$d_1 > d_3 > d_2$$

said first and third sections and said third and second sections of said bore being joined together by tapered reducing portions;

said bundle of optical fibers extending through said bore with that portion of said bundle extending through said second section being unsheathed; and metal ferrule means crimped around said tubular section to force said tubular section around said unsheathed bundle of fibers retained therein.

4. Connector means according to claim 3 in which said coupling means further comprises:

first and second parts with first ends of each part being configured to mate with said terminating means;

means for connecting together said first and second parts;

spacer means contained within said first part and having a bore extending therethrough with a diameter slightly greater than the diameter of said crimped metal ferrule means;

said spacer means being positioned within the coupled coupling means to receive in opposite ends of said bore said tubular portions, with the crimped ferrule means therearound, of said termination means;

said spacer means further being configured to limit the depth of insertion of said tubular portions into the bore to enable the alignment of the ends of said two bundles of fibers in said tubular elements.

* * * * *